United States Patent
Iida et al.

(10) Patent No.: US 11,286,576 B2
(45) Date of Patent: Mar. 29, 2022

(54) ELECTRODEPOSITION SOLUTION AND METHOD FOR PRODUCING CONDUCTOR WITH INSULATING FILM USING SAME

(71) Applicant: MITSUBISHI MATERIALS CORPORATION, Tokyo (JP)

(72) Inventors: Shintaro Iida, Amagasaki (JP); Hideaki Sakurai, Amagasaki (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

(21) Appl. No.: 16/464,847

(22) PCT Filed: Feb. 13, 2018

(86) PCT No.: PCT/JP2018/004873
§ 371 (c)(1),
(2) Date: May 29, 2019

(87) PCT Pub. No.: WO2018/151091
PCT Pub. Date: Aug. 23, 2018

(65) Prior Publication Data
US 2019/0323140 A1   Oct. 24, 2019

(30) Foreign Application Priority Data
Feb. 16, 2017   (JP) ............... JP2017-027100

(51) Int. Cl.
| | | |
|---|---|---|
| *C25D 13/08* | (2006.01) | |
| *C25D 13/16* | (2006.01) | |
| *C08L 27/18* | (2006.01) | |
| *C08L 79/08* | (2006.01) | |
| *H01B 3/30* | (2006.01) | |
| *H01B 3/44* | (2006.01) | |

(52) U.S. Cl.
CPC .............. *C25D 13/08* (2013.01); *C08L 27/18* (2013.01); *C08L 79/08* (2013.01); *C25D 13/16* (2013.01); *H01B 3/306* (2013.01); *H01B 3/445* (2013.01)

(58) Field of Classification Search
None
See application file for complete search history.

(56) References Cited

U.S. PATENT DOCUMENTS

2017/0267874 A1   9/2017   Iida et al.
2018/0127600 A1   5/2018   Iida et al.

FOREIGN PATENT DOCUMENTS

| CN | 101715474 A | 5/2010 |
|---|---|---|
| EP | 0972805 A2 | 1/2000 |

(Continued)

OTHER PUBLICATIONS

Machine translation of JP 2016-015295. (Year: 2016).*

(Continued)

*Primary Examiner* — Brian W Cohen
(74) *Attorney, Agent, or Firm* — Locke Lord LLP; James E. Armstrong, IV; Nicholas J. DiCeglie, Jr.

(57) ABSTRACT

An electrodeposition dispersion of the present invention is formed of a dispersion medium and a solid content. The solid content includes polyimide-based resin particles and fluorine resin particles. Also, a content ratio of the fluorine resin particles in the solid content is 20 to 70% by mass. In addition, a median diameter of the polyimide-based resin particles is 50 to 400 nm.

12 Claims, 2 Drawing Sheets

(56) References Cited

FOREIGN PATENT DOCUMENTS

| JP | 2001-294815 | A | | 10/2001 | | |
|----|----|----|----|----|----|----|
| JP | 2002-298674 | A | | 10/2002 | | |
| JP | 2013153107 | A | * | 8/2013 | ............ | H01L 24/45 |
| JP | 2016-015295 | A | | 1/2016 | | |
| WO | 2016/031480 | A1 | | 3/2016 | | |
| WO | 2016/190164 | A1 | | 12/2016 | | |

OTHER PUBLICATIONS

Machine translation of JP-2013153107-A. (Year: 2013).*
International Search Report dated Mar. 20, 2018, issued for PCT/JP2018/004873 and English translation thereof.
Kangcheng Qi, "Principles of Luminescence and Luminescent Materials", University of Electronic Science and Technology Press, Feb. 29, 2012, pp. 193-194.
Office Action issued in corresponding Chinese Patent Application No. CN 201880007709.0, dated Dec. 1, 2020.
Search Report issued in corresponding European Patent Application No. EP 18755015.7, dated Dec. 4, 2020.
Li Qunying "Quick start for painters", National Defense Industry Press, Apr. 2007, pp. 169-173.
Decision of Rejection issued in corresponding Chinese Patent Application No. CN 201880007709.0, dated Jan. 25, 2022.

* cited by examiner

ELECTRODEPOSITION SOLUTION AND METHOD FOR PRODUCING CONDUCTOR WITH INSULATING FILM USING SAME

TECHNICAL FIELD

The present invention relates to an electrodeposition dispersion for forming an insulating film having a low dielectric constant and a high dielectric breakdown voltage, and a method for producing a conductor having an insulating film using the electrodeposition dispersion.

Priority is claimed on Japanese Patent Application No. 2017-027100, filed on Feb. 16, 2017, the content of which is incorporated herein by reference.

BACKGROUND ART

In the related art, there is disclosed an aqueous dispersion for forming an insulating film with a low dielectric constant which is able to form an insulating film by electrodeposition of an aqueous medium in which non-film-forming fine particles having an average particle size of 1 μm or less and a relative permittivity of 3 or less and organic particles formed of at least one of a polymerizable compound and a polymer are dispersed (for example, refer to PTL 1). In the aqueous dispersion for forming an insulating film with a low dielectric constant, the non-film-forming fine particles are at least one type selected from fluorine-containing fine particles and cross-linked organic fine particles. In addition, aqueous dispersions are also prepared using aqueous emulsions in which organic particles are dispersed in an aqueous medium. Here, "aqueous medium" means a medium in which water is the main component, and the content of water in the aqueous medium is usually 40% by weight or more, and preferably 50% by weight or more.

With the aqueous dispersions for forming an insulating film with a low dielectric constant formed in this manner, it is possible to form an insulating film with a low dielectric constant and good adhesive strength by electrodeposition of this dispersion using an electrodeposition dispersion. In addition, as a result of producing the insulating film with a low dielectric constant by electrodeposition using the above aqueous dispersion, the insulating film is excellent in film thickness controllability and film formation position controllability in comparison with a case of production by coating or the like.

In addition, there is disclosed a method for producing an insulated electric wire which forms an insulating layer by carrying out electrodeposition of a water-dispersed resin emulsion, which is formed by dispersing a polyimide resin, a fluorine resin, and a charge imparting agent in water, on a conductor and then drying and baking the result (for example, refer to PTL 2). In this method for producing an insulated electric wire, the conductor is coated with a water-dispersed resin emulsion by electrodeposition. This electrodeposition is performed by passing the conductor described above through an electrodeposition bath filled with the water-dispersed resin emulsion to apply a voltage in a state where the conductor is immersed in the water-dispersed resin emulsion, or the like.

In the method for producing an insulated electric wire formed in this manner, it is possible to produce an insulated electric wire provided with an insulating layer which has a sufficient insulation performance, which has little thickness, and which is also excellent in heat resistance. As a result, it is possible to suitably use the insulated electric wire for wiring in an electronic device or between electronic devices where heat resistance is required.

CITATION LIST

Patent Literature

[PTL 1] Japanese Unexamined Patent Application, First Publication No. 2001-294815 (claim 1, claim 2, Paragraphs [0023], [0068])

[PTL 2] Japanese Unexamined Patent Application, First Publication No. 2002-298674 (claim 1, Paragraphs [0020], [0037], FIG. 1)

SUMMARY OF INVENTION

Technical Problem

However, in the aqueous dispersion for forming an insulating film with a low dielectric constant disclosed in PTL 1 of the related art described above, there is also a problem in that, since the particle size of the organic particles is not shown and the ratio of water to the solvent in the electrodeposition dispersion is high, the evaporation speed of the solvent at the time of drying is high and foaming is likely to occur, making it difficult to form a thick film. On the other hand, in the method for producing an insulated electric wire disclosed in PTL 2 of the related art described above, there is a problem in that, since the particle size of the polyimide resin is not shown and the solvent in the water-dispersed resin emulsion (electrodeposition dispersion) is all water, the evaporation speed of the solvent at the time of drying is high and foaming is likely to occur, making it difficult to form a thick film.

An objective of the present invention is to provide an electrodeposition dispersion which is able to thicken a composite film of a polyimide-based resin and a fluorine resin and able to obtain an insulating film with a low dielectric constant and a high dielectric breakdown voltage, and a method for producing a conductor with an insulating film using the electrodeposition dispersion.

Solution to Problem

A first aspect of the present invention is an electrodeposition dispersion including a dispersion medium, and a solid content, in which the solid content includes polyimide-based resin particles and fluorine resin particles, a content ratio of the fluorine resin particles in the solid content is 20 to 70% by mass, and a median diameter of the polyimide-based resin particles is 50 to 400 nm.

A second aspect of the present invention is an invention based on the first aspect, in which the dispersion medium includes a polar solvent, water, and a base, the polar solvent has a boiling point higher than the water, and a content ratio of the water in the dispersion medium is 15 to 40% by mass.

A third aspect of the present invention is an invention based on the first or second aspect, in which the polyimide-based resin particles have a median diameter smaller than the fluorine resin particles.

A fourth aspect of the present invention is a method for producing a conductor with an insulating film which forms an insulating film by electrodeposition on a surface of a conductor using the electrodeposition dispersion according to any one of the first to third aspects.

A fifth aspect of the present invention is an invention based on the fourth aspect, in which the conductor is a metal wire.

Advantageous Effects of Invention

In the electrodeposition dispersion according to the first aspect of the present invention, since the median diameter of the polyimide-based resin particles is as small as 50 to 400 nm, it is possible to reduce the amount of dispersion medium trapped between the polyimide-based resin particles or between the fluorine resin particles during electrodeposition, and to suppress foaming of the insulating film during a heat treatment. As a result, since it is possible to thicken the insulating film which is a composite film of polyimide-based resin and fluorine resin, it is possible to lower the dielectric constant, partial discharge does not easily occur, and it is possible to increase the dielectric breakdown voltage of the insulating film.

In the electrodeposition dispersion according to the second aspect of the present invention, since the polar solvent has a boiling point higher than that of water, and the content ratio of water in the dispersion medium is as small as 15 to 40% by mass, the evaporation speed of the dispersion medium during a heat treatment is slow and it is possible to further suppress foaming of the insulating film during a heat treatment. In particular, it is possible to further suppress the foaming of the insulating film even in a case where the film is finally left in a furnace set to a temperature required for the heat treatment of the film.

In the electrodeposition dispersion according to the third aspect of the present invention, since the polyimide-based resin particles have a median diameter smaller than the fluorine resin particles, it is possible for the polyimide-based resin particles to easily enter gaps between the fluorine resin particles. As a result, it is possible to reduce the amount of the trapped dispersion medium and to further suppress foaming of the insulating film during a heat treatment.

In the method for producing a conductor with an insulating film according to the fourth aspect of the present invention, since the insulating film is formed on the conductor surface by electrodeposition using the electrodeposition dispersion described above, it is possible to suppress foaming of the insulating film during a heat treatment. As a result, since it is possible to thicken the insulating film, it is possible to produce a conductor having an insulating film in which the dielectric constant is low, partial discharge does not easily occur, and the dielectric breakdown voltage is high.

In the method for producing a conductor with an insulating film according to the fifth aspect of the present invention, since the insulating film is formed on the metal wire surface by electrodeposition using the electrodeposition dispersion described above, it is possible to suppress foaming of the insulating film during a heat treatment. As a result, since it is possible to thicken the insulating film, it is possible to produce a metal wire having an insulating film in which the dielectric constant is low, partial discharge does not easily occur, and the dielectric breakdown voltage is high.

DESCRIPTION OF EMBODIMENTS

Figure 1:
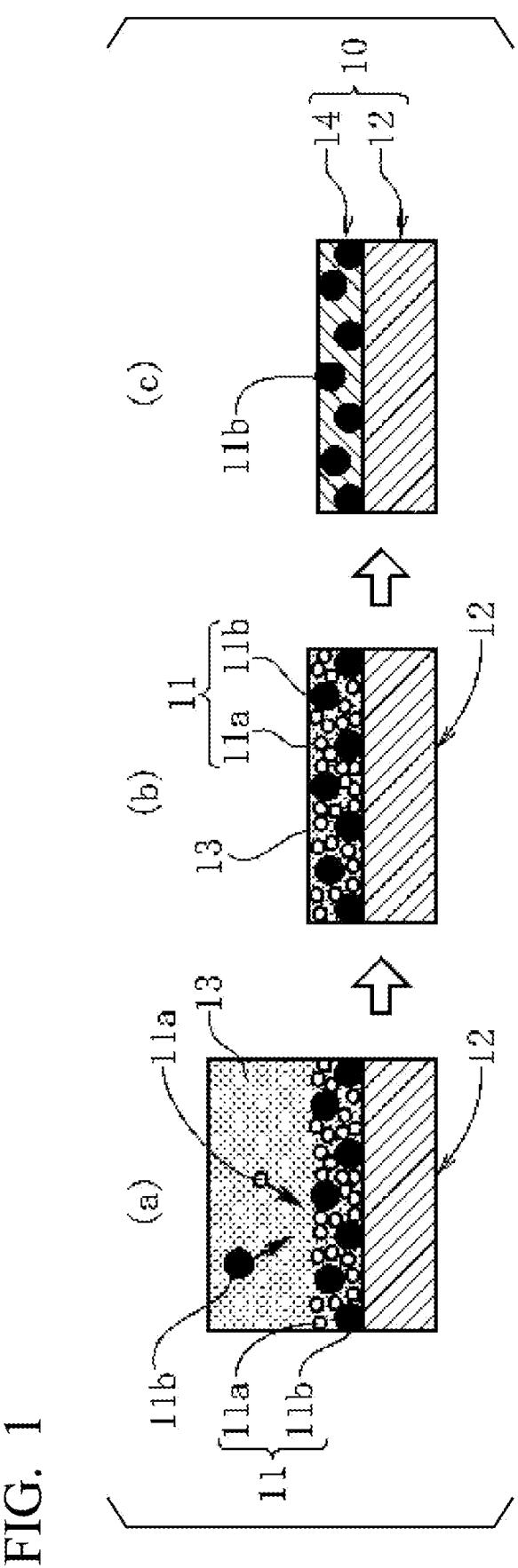
FIG. 1 is a schematic diagram showing a mechanism of an embodiment of the present invention with which no bubbles are generated when an insulating film is formed using an electrodeposition dispersion in which polyimide-based resin particles have a small median diameter, and (a) is a cross-sectional schematic diagram which shows an electrodeposition dispersion immediately after electrodeposition initiation, (b) is a cross-sectional schematic diagram which shows an electrodeposition film after electrodeposition completion, and (c) is a cross-sectional schematic diagram which shows an insulating film after a baking treatment.

Next, a description will be given of an embodiment for realizing the present invention based on the drawings. The electrodeposition dispersion is formed of a dispersion medium and a solid content. The solid content includes polyimide-based resin particles and fluorine resin particles. Examples of polyimide-based resins include polyamide imide resins, polyimide resins, polyester imide resins, polyamic acid resins, and the like. In addition, examples of fluorine resins include polytetrafluoroethylene (tetrafluorinated) resin, tetrafluoroethylene-perfluoroalkyl vinyl ether copolymer resin, perfluoroethylene propene copolymer resin, polyvinylidene fluoride resin, and the like.

The content ratio of the fluorine resin particles in the solid content is 20 to 70% by mass, and preferably 30 to 70% by mass. In addition, the median diameter of the polyimide-based resin particles is 50 to 400 nm, and preferably 50 to 200 nm. In addition, the median diameter of the fluorine resin particles is 50 to 500 nm, and preferably 50 to 300 nm. Furthermore, it is preferable that the polyimide-based resin particles have a median diameter smaller than the fluorine resin particles. Here, the reason why the content ratio of the fluorine resin particles in the solid content is limited to a range of 20 to 70% by mass is because, when less than 20% by mass, it is not possible to reduce the dielectric constant of the insulating film and, when over 70% by mass, the insulating film does not form a continuous film and cracks are easily generated. In addition, the reason why the median diameter of the polyimide-based resin particles is limited to a range of 50 to 400 nm is because, when less than 50 nm, the electrodeposition speed is reduced and time is needed to obtain a thick film since there is little dispersion medium present between the resin particles and the resistance of the film is increased, and when over 400 nm, the dispersion stability of the electrodeposition dispersion decreases and the evaporation amount of water increases such that the insulating film foams easily when drying the electrodeposition dispersion to form a thick insulating film. Furthermore, the reason why the preferable median diameter of the fluorine resin particles is limited to a range of 50 to 500 nm is because, when less than 50 nm, since there is little dispersion medium present between the resin particles and the resistance of the film is increased, the electrodeposition speed is reduced and time is needed to obtain a thick film, and when over 500 nm, the electrodeposition dispersion agglomerates to cause precipitation, and the dispersion stability is reduced.

The dispersion medium preferably includes a polar solvent, water, and a base. In addition, the polar solvent preferably has a boiling point higher than that of water. Examples of polar solvents include organic solvents such as N-methyl-2-pyrrolidone, 1,3-dimethyl-2-imidazolidinone, dimethyl sulfoxide, and N,N dimethylacetamide. Furthermore, examples of bases include tri-n-propylamine, dibutylamine, piperidine, triethylamine, and the like. The content ratio of water in the dispersion medium is preferably 15 to 40% by mass, and more preferably 18 to 30% by mass. In addition, the content ratio of the polar solvent in the dispersion medium is preferably 60 to 70% by mass, and more preferably 65 to 70% by mass. The content ratio of the base in the dispersion medium is preferably 0.1 to 0.3% by mass, and more preferably 0.1 to 0.2% by mass. Furthermore, the content ratio of the solid content in the electrodeposition dispersion is preferably 1 to 10% by mass, and more preferably 2 to 5% by mass.

Here, the reason why the preferable content ratio of water in the dispersion medium is limited to a range of 15 to 40% by mass is because, when less than 15% by mass, the electrical conductivity of the electrodeposition dispersion is low and it is not possible to form an insulating film by electrodeposition, and, when over 40% by mass, the evaporation speed of the dispersion medium is high when drying the electrodeposition dispersion, and the insulating film foams easily when the insulating film is formed to be thick. In addition, the reason why the preferable content ratio of the polar solvent in the dispersion medium is limited to a range of 60 to 70% by mass is because, when less than 60% by mass, the ratio of water in the dispersion medium is increased and the evaporation speed is increased to cause foaming, and, when over 70% by mass, the ratio of water in the dispersion medium is reduced, the electrodeposition speed is reduced, and time is needed to obtain a thick film. In addition, the reason why the preferable content ratio of the base in the dispersion medium is limited to a range of 0.1 to 0.3% by mass is because, when less than 0.1% by mass, the median diameter of the polyimide-based resin particles increases and the dispersion stability deteriorates, and, when over 0.3% by mass, the median diameter of the polyimide-based resin particles is reduced, the dispersion medium present between the resin particles is reduced and the resistance of the film increases, thus, the electrodeposition speed is reduced and time is needed to obtain a thick film. Furthermore, the reason why the preferable content ratio of the solid content in the electrodeposition dispersion is limited to a range of 1 to 10% by mass is because, when less than 1% by mass, the electrodeposition speed is reduced and time is needed to obtain a thick film, and, when over 10% by mass, the dispersion stability is deteriorated. The median diameter of the polyimide-based resin particles and the median diameter of the fluorine resin particles are the volume-based average particle sizes measured using an apparatus for measuring dynamic light scattering particle size distribution (LB-550 manufactured by Horiba, Ltd.).

Next, a description will be given of a method for producing an electrodeposition dispersion.

[Synthesis of Polyimide-Based Resin Varnish]

First, a polar solvent, an isocyanate component, and an acid component are mixed in a 2-liter four-necked flask provided with a stirrer, a cooling pipe, a nitrogen introducing pipe, and a thermometer, and the temperature is raised to 80 to 130° C. and this temperature is maintained for 2 to 8 hours to cause a reaction to obtain a polyimide-based resin. Here, examples of isocyanate components include aromatic diisocyanates such as diphenylmethane-4,4'-diisocyanate (MD1), diphenylmethane-3,3'-diisocyanate, diphenylmethane-3,4'-diisocyanate, diphenylether-4,4'-diisocyanate, benzophenone-4,4'-diisocyanate, and diphenyl sulfone-4,4'-diisocyanate, and the like, and examples of acid components include trimellitic anhydride (TMA), 1,2,5-trimellitic acid (1,2,5-ETM), biphenyl tetracarboxylic acid dianhydride, benzophenone tetracarboxylic acid dianhydride, diphenyl sulfone tetracarboxylic acid dianhydride, oxydiphthalic acid dianhydride (OPDA), pyromellitic acid dianhydride (PMDA), 4,4'-(2,2'-hexafluoroisopropylidene) diphthalic dianhydride, and the like. Thereafter, the synthesized polyimide-based resin is diluted with a polar solvent to prepare a polyimide-based resin varnish.

[Preparation of Dispersion of Polyimide-Based Resin Particles]

Next, the polyimide-based resin varnish obtained above is further diluted with an organic solvent, a basic compound is added thereto, and then water is added thereto at room temperature while stirring. Due to this, a dispersion of polyimide-based resin particles with a median diameter of 50 to 400 nm is obtained.

[Preparation of Dispersion of Fluorine Resin Particles]

It is possible to obtain a dispersion of fluorine resin particles with a median diameter of 50 to 500 nm by diluting commercially available fluorine resin particles with water and then stirring the result.

[Preparation of Electrodeposition Dispersion]

An electrodeposition dispersion is obtained by mixing the dispersion of the polyimide-based resin particles and the dispersion of the fluorine resin particles.

When forming an insulating film on a conductor surface using the electrodeposition dispersion described above, it is preferable to form the insulating film on the surface of the conductor by forming an electrodeposition film on the surface of the conductor by an electrodeposition method using an electrodeposition dispersion and then carrying out a drying treatment and a baking treatment. The thickness of the insulating film is preferably 10 to 70 μm, and more preferably 20 to 50 μm. In a case where the thickness of the insulating film is 40 μm, the dielectric breakdown voltage of the insulating film is preferably at least 5 kV. In addition, examples of the conductor described above include a metal wire, a metal plate, and the like. In a case where the conductor is a metal wire, the material of the metal wire is preferably copper, a copper alloy, aluminum, an aluminum alloy, or the like having good conductivity.

Figure 2:
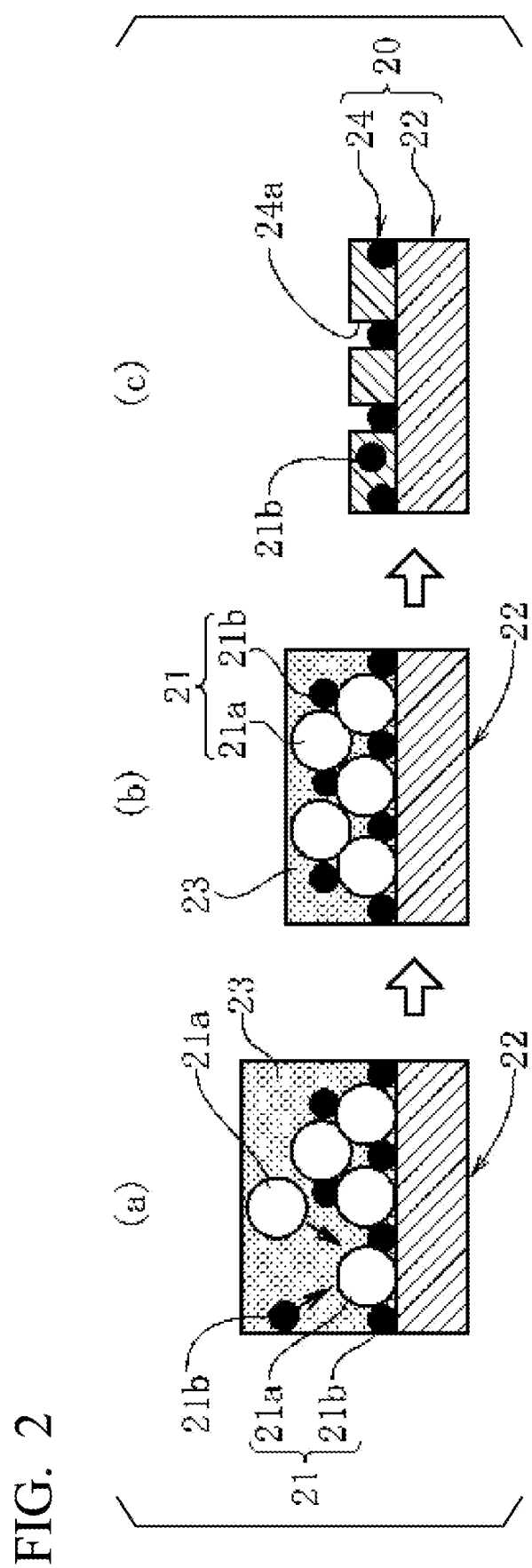
FIG. 2 is a schematic diagram showing a mechanism of a reference embodiment with which bubbles are generated when an insulating film is formed using an electrodeposition dispersion in which polyimide-based resin particles have a large median diameter, and (a) is a cross-sectional schematic diagram which shows an electrodeposition dispersion immediately after electrodeposition initiation, (b) is a cross-sectional schematic diagram which shows an electrodeposition film after electrodeposition completion, and (c) is a cross-sectional schematic diagram which shows an insulating film after a baking treatment.

In the conductor with an insulating film formed in this manner, since the median diameter of the polyimide-based resin particles in the electrodeposition dispersion for forming the insulating film is as small as 50 to 400 nm, it is possible to reduce the amount of the dispersion medium trapped between the polyimide-based resin particles and the fluorine resin particles during the electrodeposition and to suppress foaming in the insulating film during a heat treatment. Specifically, as shown in FIG. 1, in a case where, among polyimide-based resin particles 11a and fluorine resin particles 11b which are a solid content 11, the median diameter of the polyimide-based resin particles 11a is as small as 50 to 400 nm, since many of the polyimide-based resin particles 11a enter between the fluorine resin particles 11b on the surface of a conductor 12 so as to be tightly packed and a dispersion medium 13 remaining between the particles 11a and 11b is reduced (FIG. 1(b)), foaming is not easily generated in an insulating film 14 after a baking treatment (FIG. 1(c)). On the other hand, as shown in FIG. 2, in a case where, among polyimide-based resin particles 21a and fluorine resin particles 21b which are a solid content 21, the median diameter of the fluorine resin particles 21b is the same as that of the fluorine resin particles 11b and the median diameter of the polyimide-based resin particles 21a is larger than the range described above, since many of the polyimide-based resin particles 21a are not able to enter between the fluorine resin particles 21b on the surface of a conductor 22 and are roughly packed and a dispersion medium 23 remaining between the particles 21a and 21b is increased (FIG. 2(b)), foaming 24a is easily generated in an insulating film 24 after a baking treatment (FIG. 2(c)). As a result, in the present embodiment, since it is possible to thicken the insulating film 14 which is a composite film of polyimide-based resin and fluorine resin, it is possible to increase the dielectric breakdown voltage of the insulating film 14 of the conductor 10 with an insulating film. In addition, in the present embodiment, due to the polar solvent having a boiling point higher than that of water, and the content ratio of the water in the dispersion medium being reduced to 15 to 40% by mass, it is possible to reduce the evaporation speed of the dispersion medium during a heat treatment and to further suppress foaming of the insulating film during a heat treatment. Furthermore, in the present embodiment, if the polyimide-based resin particles have a median diameter smaller than the fluorine resin particles, the polyimide-based resin particles easily enter the gaps between the fluorine resin particles, thus, it is possible to reduce the amount of the trapped dispersion medium and to further suppress the foaming of the insulating film during a heat treatment.

EXAMPLES

Next, a detailed description will be given of Examples and Comparative Examples of the present invention.

Example 1

A description will be given of a method for producing an electrodeposition dispersion.

[Synthesis of Polyimide-Based Resin Varnish]

First, 747 g of N-methyl-2-pyrrolidone (polar solvent), 298 g (1.19 moles) of diphenylmethane-4,4'-diisocyanate (MDI, isocyanate component), and 227 g (1.18 moles) of trimellitic anhydride (TMA, acid component) were added to a 2-liter four-necked flask provided with a stirrer, a cooling pipe, a nitrogen introducing pipe, and a thermometer, and the temperature was raised to 130° C. By reacting at this temperature for approximately 4 hours, a polymer (polyamideimide resin) having a number average molecular weight of 17000 was obtained. Thereafter, the synthesized polyamideimide resin was diluted with N-methyl-2-pyrrolidone (polar solvent) such that the polyamideimide resin (nonvolatile component) concentration was 20% by mass to obtain a polyamideimide resin varnish (polyamideimide resin:N-methyl-2-pyrrolidone=20% by mass:80% by mass).

[Preparation of Dispersion of Polyimide-Based Resin Particles]

Next, after 62.5 g of the obtained polyamideimide resin varnish was further diluted with 140 g of N-methyl-2-pyrrolidone (polar solvent), and 0.5 g of tri-n-propylamine (basic compound (base)) was added thereto, then 47 g of water was added thereto at room temperature (25° C.) while this solution was stirred at a high rotation speed of 10,000 rpm. Due to this, 250 g of a dispersion of polyamideimide resin particles having a median diameter of 160 nm (polyamideimide resin particles:N-methyl-2-pyrrolidone:water: tri-n-propylamine=5% by mass:76% by mass:18.8% by mass:0.2% by mass) was obtained.

[Preparation of Dispersion of Fluorine Resin Particles]

Polyflon PTFE-D (manufactured by Daikin Industries, Ltd.) with 60% by mass of fluorine resin particles and 40% by mass of water was diluted with water to obtain a dispersion of fluorine resin particles having a median diameter of 200 nm (fluorine resin particles:water=30% by mass: 70% by mass).

[Preparation of Electrodeposition Dispersion]

60 g of a dispersion of polyimide-based resin particles and 10 g of a dispersion of fluorine resin particles were mixed and an electrodeposition dispersion was obtained (polyamideimide resin particles:fluorine resin particles:N-methyl-2-pyrrolidone:water:tri-n-propylamine=4.3% by mass:4.3% by mass:65% by mass:26.2% by mass:0.2% by mass). The polyamideimide resin particles and the fluorine resin particles are the solid content, and the N-methyl-2-pyrrolidone (polar solvent), water, and the tri-n-propylamine (base) are the dispersion medium.

[Production of Insulating Film]

An insulating film was produced using the prepared electrodeposition dispersion. Specifically, first, an electrodeposition dispersion was stored in an electrodeposition tank, and the temperature of the electrodeposition dispersion in the electrodeposition tank was set to 20° C. Subsequently, a copper wire (conductor) having a diameter and a length of 1 mm and 300 mm, respectively, was used as an anode, a cylindrical copper sheet inserted in the electrodeposition dispersion in the electrodeposition tank was used as a cathode, and, in a state where a DC voltage of 100 V was applied between the copper wire and the cylindrical copper sheet, the copper wire and the cylindrical copper sheet were held in the electrodeposition dispersion in the electrodeposition tank for 30 seconds. Due to this, an electrodeposition film was formed on the surface of the copper wire. Next, the copper wire on which the electrodeposition film was formed was left to stand in a muffle furnace at 250° C. for 3 minutes and subjected to a drying treatment to obtain a copper wire on which an insulating film having a thickness of 40 μm was formed. This copper wire with an insulating film is referred to as Example 1.

Examples 2 to 10 and Comparative Examples 1 to 8

As shown in Table 1, by changing the types of polyimide-based resin particles and fluorine-based resin particles, the content ratio of the polyimide-based resin particles in the solid content, the content ratio of the fluorine resin particles in the solid content, the content ratio of the polar solvent in the dispersion medium, the content ratio of water in the dispersion medium, the content ratio of the base in the dispersion medium, and the median diameter of the polyimide-based resin particles, respectively, electrodeposition dispersions were prepared in the same manner as in Example 1, and copper wires with an insulating film were produced using these electrodeposition dispersions. These copper wires with an insulating film are referred to as Examples 2 to 10 and Comparative Examples 1 to 5.

<Comparison Test 1 and Evaluation>

The external appearances of the insulating films of the copper wire with an insulating film of Examples 1 to 10 and Comparative Examples 1 to 5 were observed and the relative permittivities and the dielectric breakdown voltages thereof were each measured. Specifically, the external appearance of the insulating film was visually observed. In addition, the relative permittivity was determined by calculating the dielectric constant from the capacitance of the insulating film and the film thickness of the insulating film using an LCR meter (manufactured by Hioki E.E. Corp.), and dividing the dielectric constant by the dielectric constant ε0 of vacuum ($8.85 \times 10^{-12}$ F/m). Here, the film thickness of the insulating film was measured using a micrometer (manufactured by Mitsutoyo Corp.). Furthermore, the dielectric breakdown voltage was measured by winding a metal foil around a conductive wire with an insulating film with a thickness of 40 μm and using a dielectric breakdown tester (manufactured by TOTOKU TORYO Co., LTD.). The results are shown in Table 1.

Here, in the external appearance of the insulating film in Table 1, "Good" indicates that it was possible to carry out electrodeposition of the insulating film without generating cracks in the insulating film, "Cracks" indicates that cracks were generated in the insulating film, "Electrodeposition not possible" indicates that it was not possible to form an insulating film having a thickness of 40 μm, and "Foaming" indicates that foaming was generated in the insulating film. In addition, in Table 1, "PI-based resin particles" are polyimide-based resin particles, "PAI" is polyamideimide resin particles, "PI" is polyimide resin particles, and "PTFE" is polytetrafluoroethylene (tetrafluorinated) resin particles (Polyflon PTFE-D manufactured by Daikin Industries, Ltd.), and "PFA" is tetrafluoroethylene-perfluoroalkyl vinyl ether copolymer resin particles (Neoflon PFA manufactured by Daikin Industries, Ltd.). In addition, in Table 1, PI/solid content is the content ratio of the polyimide-based resin particles in the solid content (total amount of fluorine resin particles and polyimide-based resin particles), F/solid content is the content ratio of the fluorine resin particles in the solid content (total amount of fluorine resin particles and polyimide-based resin particles), and the "dispersion medium" is the total amount of the water, the polar solvent, and the base.

appearance of the insulating film was good and the dielectric breakdown voltage was as high as 6.3 kV, but the relative permittivity was as high as 4.7, in Comparative Example 2 in which the fluorine resin particles are as low as 10% by mass, the external appearance of the insulating film was good and the dielectric breakdown voltage is as high as 6.1 kV, but the relative permittivity was as high as 4.5, and, in Comparative Example 3 in which the content of the fluorine resin particles was 80% by mass, the relative permittivity of the insulating film was as low as 2.7, but cracks were generated in the insulating film and the dielectric breakdown voltage was as low as 0.4 kV. On the other hand, in Examples 1 to 3 in which the fluorine resin particles were in an appropriate range of 20 to 70% by mass, the external appearance of the insulating film was good, the relative permittivity was as low as 2.8 to 4.3, and the dielectric breakdown voltage was as high as 5.0 to 6.0 kV.

In addition, in Comparative Example 6 in which the median diameter of the polyamideimide resin particles was as large as 500 nm, the relative permittivity of the insulating film was as low as 3.4, but there was foaming in the insulating film and the dielectric breakdown voltage was 0.5 kV, and, in Comparative Example 7 in which the median diameter of the polyamideimide resin particles was as low as 20 nm, the relative permittivity of the insulating film was as low as 3.4, but the thickness of the insulating film did not reach 40 μm and it was not possible to measure the dielectric breakdown voltage of the insulating film with a thickness of 40 μm. On the other hand, in Examples 6 and 7 in which the median diameter of the polyamideimide resin particles was in the appropriate range of 50 to 400 nm, the external appearance of the insulating film was good, the relative permittivity was as low as 3.4, and the dielectric breakdown voltage was as high as 5.5 kV.

Furthermore, in Examples 4 and 5 in which the water/dispersion medium had the lower limit value and the upper limit value in the preferable range of 10 to 40% by mass, the

TABLE 1

| | Type of resin particles | | Solid content ratio (% by mass) | | Solvent ratio (% by mass) | | | Median diameter | Insulating film | | |
|---|---|---|---|---|---|---|---|---|---|---|---|
| | PI-based resin particles | Fluorine resin particles | PI/Solid content | F/Solid content | Polar solvent/dispersion | Water/dispersion | Base/dispersion | of PI particles (nm) | External appearance | Relative permittivity | Dielectric breakdown voltage (kV) |
| Example 1 | PAI | PTFE | 80 | 20 | 71.1 | 28.7 | 0.2 | 160 | Good | 4.3 | 6.0 |
| Example 2 | PAI | PTFE | 50 | 50 | 71.1 | 28.7 | 0.2 | 160 | Good | 3.4 | 5.8 |
| Example 3 | PAI | PTFE | 30 | 70 | 71.1 | 28.7 | 0.2 | 160 | Good | 2.8 | 5.0 |
| Example 4 | PAI | PTFE | 50 | 50 | 84.8 | 15.0 | 0.2 | 160 | Good | 3.4 | 5.7 |
| Example 5 | PAI | PTFE | 50 | 50 | 59.8 | 40.0 | 0.2 | 160 | Good | 3.4 | 5.5 |
| Example 6 | PAI | PTFE | 50 | 50 | 71.2 | 28.7 | 0.1 | 400 | Good | 3.4 | 5.5 |
| Example 7 | PAI | PTFE | 50 | 50 | 71.0 | 28.7 | 0.3 | 50 | Good | 3.4 | 5.5 |
| Example 8 | PAI | PFA | 50 | 50 | 71.1 | 28.7 | 0.2 | 160 | Good | 3.4 | 5.8 |
| Example 9 | PI | PTFE | 50 | 50 | 71.1 | 28.7 | 0.2 | 150 | Good | 3.0 | 5.5 |
| Example 10 | PI | PFA | 50 | 50 | 71.1 | 28.7 | 0.2 | 150 | Good | 3.0 | 5.3 |
| Comparative Example 1 | PAI | None | 100 | 0 | 71.1 | 28.7 | 0.2 | 160 | Good | 4.7 | 6.3 |
| Comparative Example 2 | PAI | PTFE | 90 | 10 | 71.1 | 28.7 | 0.2 | 160 | Good | 4.5 | 6.1 |
| Comparative Example 3 | PAI | PTFE | 20 | 80 | 71.1 | 28.7 | 0.2 | 160 | Cracks | 2.7 | 0.4 |
| Comparative Example 4 | PAI | PTFE | 50 | 50 | 71.25 | 28.7 | 0.05 | 500 | Foaming | 3.4 | 0.5 |
| Comparative Example 5 | PAI | PTFE | 50 | 50 | 71.0 | 28.7 | 0.4 | 20 | Electrodeposition not possible | 3.4 | — |

As is clear from Table 1, in Comparative Example 1 in which only the polyamideimide resin particles were used without using the fluorine resin particles, the external external appearance of the insulating film was good, the relative permittivity was as low as 3.4, and the dielectric breakdown voltage was as high as 5.5 to 5.7 kV.

On the other hand, in Example 8 in which PFA resin particles were mixed with polyamideimide resin particles, the external appearance of the insulating film was good, the relative permittivity was as low as 3.4, and the dielectric breakdown voltage was as high as 5.8 kV. In addition, in Example 9 in which PTFE resin particles were mixed with polyimide resin particles, the external appearance of the insulating film was good, the relative permittivity was as low as 3.0, and the dielectric breakdown voltage was as high as 5.5 kV. Furthermore, in Example 10 in which PFA resin particles were mixed with polyimide resin particles, the external appearance of the insulating film was good, the relative permittivity was as low as 3.0, and the dielectric breakdown voltage was as high as 5.3 kV.

INDUSTRIAL APPLICABILITY

It is possible to use the electrodeposition dispersion of the present invention for the production of products for which excellent partial discharge resistance and coating having a high dielectric breakdown voltage are necessary, such as insulated electric wires.

REFERENCE SIGNS LIST

10 Conductor with insulating film
11 Solid content
11a Polyimide-based resin particles
11b Fluorine resin particles
12 Conductor
13 Dispersion medium
14 Insulating film

The invention claimed is:

1. An electrodeposition dispersion comprising:
a dispersion medium; and
a solid content,
wherein the solid content includes polyamide imide resin particles and fluorine resin particles,
a content ratio of the fluorine resin particles in the solid content is 20 to 70% by mass,
a median diameter of the polyamide imide resin particles is 50 to 400 nm,
the dispersion medium consists of a polar solvent, water, and a base,
a content ratio of the water in the dispersion medium is 15 to 40% by mass,
a content ratio of the polar solvent in the dispersion medium is 60 to 70% by mass,
a content ratio of the base in the dispersion medium is 0.1 to 0.3% by mass, and
a content ratio of the solid content in the electrodeposition dispersion is 1 to 10% by mass.

2. The electrodeposition dispersion according to claim 1, wherein the polar solvent has a boiling point higher than the water.

3. The electrodeposition dispersion according to claim 1, wherein the polyamide imide resin particles have a median diameter smaller than the fluorine resin particles.

4. A method for producing a conductor with an insulating film which forms an insulating film by electrodeposition on a surface of a conductor using the electrodeposition dispersion according to claim 1.

5. The method for producing a conductor with an insulating film according to claim 4, wherein the conductor is a metal wire.

6. The electrodeposition dispersion according to claim 2, wherein the polyamide imide resin particles have a median diameter smaller than the fluorine resin particles.

7. A method for producing a conductor with an insulating film which forms an insulating film by electrodeposition on a surface of a conductor using the electrodeposition dispersion according to claim 2.

8. A method for producing a conductor with an insulating film which forms an insulating film by electrodeposition on a surface of a conductor using the electrodeposition dispersion according to claim 3.

9. A method for producing a conductor with an insulating film which forms an insulating film by electrodeposition on a surface of a conductor using the electrodeposition dispersion according to claim 6.

10. The method for producing a conductor with an insulating film according to claim 7, wherein the conductor is a metal wire.

11. The method for producing a conductor with an insulating film according to claim 8, wherein the conductor is a metal wire.

12. The method for producing a conductor with an insulating film according to claim 9, wherein the conductor is a metal wire.

* * * * *